Figure 1:
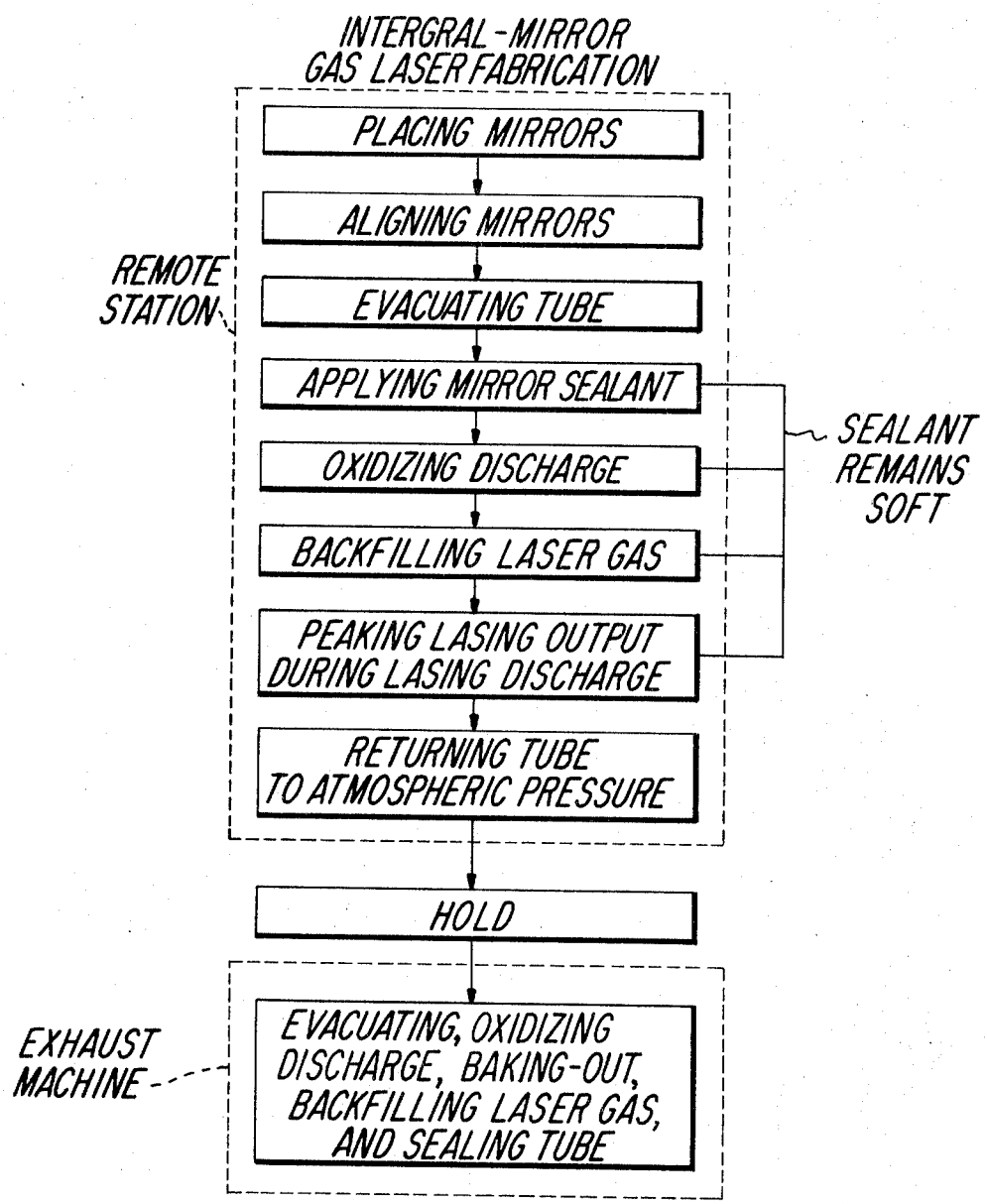

United States Patent [19]
Horton et al.

[11] 3,740,110
[45] June 19, 1973

[54] FABRICATION METHOD FOR GAS LASERS HAVING INTEGRAL MIRRORS

[75] Inventors: Murray Robert Horton, Lititz; Robert Stephen Kutay, East Petersburg, both of Pa.

[73] Assignee: RCA Corporation, New York, N.Y.

[22] Filed: May 10, 1971

[21] Appl. No.: 141,635

[52] U.S. Cl............................ 316/21, 316/18, 316/26
[51] Int. Cl............................. H01j 9/38, H01j 17/26
[58] Field of Search................... 316/1, 17, 18, 19, 316/20, 21, 22, 24, 26, 23, 29

[56] References Cited
UNITED STATES PATENTS
3,390,351   6/1968   Bell................................. 316/26 X Primary Examiner—John F. Campbell
Assistant Examiner—Richard Bernard Lazarus
Attorney—Edward J. Norton and George J. Seligsohn

[57] ABSTRACT

Attaching integral mirrors to the opposite ends of the laser tube with a sealant which remains soft for a given time, and then while the sealant is still soft operating a lasing discharge in the tube until mechanical equilibrium is reached, and thereafter in the presence of this lasing discharge adjusting the relative positions of the mirrors to substantially achieve peak output from the laser. Useful for mass production of laser tubes, where the peaking of the laser output is done at a remote station, after which the tube is returned to atmospheric pressure and can be stored until it can be finally processed by a conventional exhaust machine.

6 Claims, 2 Drawing Figures

FABRICATION METHOD FOR GAS LASERS HAVING INTEGRAL MIRRORS

This invention relates to the fabrication of gas laser discharge devices and, more particularly, to the fabrication of such gas laser discharge devices provided with an optical resonant cavity formed by integral mirrors attached to opposite ends of the envelope of the discharge device.

In the fabrication of all types of gas discharge devices which are intended to have a reasonably long life, it is necessary to evacuate the tube of the gas discharge device and remove substantially all contaminants that may be present before backfilling the tube with a required amount of discharge gas and then permanently sealing the tube. To satisfactorily remove these contaminants, it is usually necessary after evacuation of the tube to bake out the tube at an elevated temperature for a required time while the evacuation of the tube continues. In many cases, it is also desirable to institute an oxidizing discharge in the tube, preferably before bakeout, while the tube is evacuated. Only then is the tube backfilled with the proper amount of the discharge gas and permanently sealed.

In order to mass produce many types of gas discharge devices, exhaust machines, both rotary and stationary, have been developed which may be employed to automatically accomplish the required bakeout, oxidizing discharge, laser-gas backfilling and, finally, permanent sealing. Although a gas laser equipped with integral mirrors which form part of the enclosure is a gas discharge device, up to now there have been inherent problems preventing the use of conventional automatic exhaust machines in fabricating this type of device.

In particular, the integral mirrors of the laser enclosure, which form its optical resonant cavity, must be quite precisely aligned with respect to each other in order for the laser to operate at all. In order for the laser to operate at peak output, the relative positioning of the mirrors with respect to each other is extremely critical. Since the proper alignment of these mirrors cannot be accomplished within an automatic exhaust machine, it has not been the practice up to now to employ such a machine in fabricating gas lasers.

Furthermore, since the mirrors, when attached, form part of the overall gas enclosure of discharge tube, in the past it has been the practice to properly align the mirrors with respect to each other, with the use of an auxiliary alignment laser, prior to the backfilling of the laser discharge tube with the required laser discharge gas. Thus, in accordance with past fabrication techniques, all alignment of the internal mirrors of the gas laser was completed prior to any operation of the gas laser to produce an actual lasing output therefrom.

It has been found that when a laser is fabricated in accordance with these past techniques, it does, when finally operated, produce a lasing output as expected. However, the maximum output obtained is somewhat less than the peak output to be expected. The reason for this, it has been found, is that the mechanical equilibrium orientation of the mirrors with respect to each other when the tube is actually operating is shifted with respect to the mechanical equilibrium orientation thereof which existed when the mirrors were aligned. This shift is due to the fact that the alignment was done with the tube at room temperature and with the pressure inside and outside the tube substantially equal to each other, while when the tube is operated its temperature is substantially higher than room temperature and the pressure inside the tube is significantly smaller than the pressure outside the tube. The resulting thermal and pressure loading stresses on the tube produces this shift in the mechanical equilibrium orientation.

In accordance with the present invention, the respective positions of the mirrors may be finally adjusted with the tube actually operating and having reached mechanical equilibrium. This ensures that the fabricated laser will lase at substantially peak output when completed.

Furthermore, the present invention permits the mass-production benefits of employing a conventional automatic exhaust machine to be extended to the fabrication of a gas laser having internal, integral mirrors.

Figure 2:
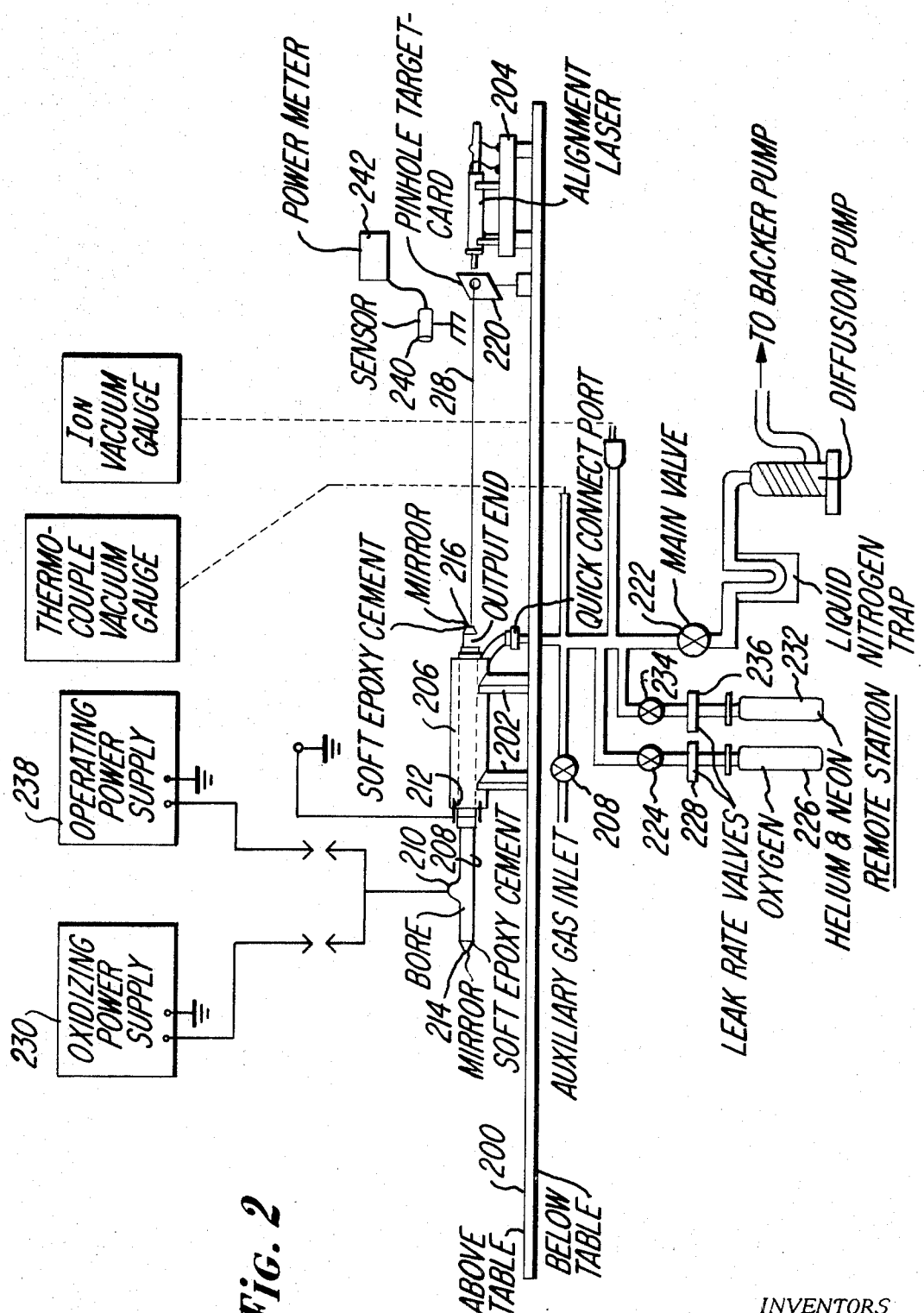

Other features and advantages of the present invention will become more apparent from the following detailed description taken together with the accompanying drawing, in which:

FIG. 1 is a flow sheet of the steps comprising a preferred embodiment of the present invention, and FIG. 2 is a schematic showing of the remote station of FIG. 1.

Referring to FIG. 1, the internal-mirror gas laser fabrication of the present invention involves a plurality of successive steps which take place at a remote station. FIG. 2 shows the apparatus at the remote station for performing these steps.

Referring to FIG. 2, the remote station comprises table 200 on which is located tube holder 202 and alignment laser 204. Laser tube 206, which is being fabricated, is supported by tube holder 202. Tube 206, as originally placed in tube holder 202 comprises the complete envelope including bore 208, as well as anode electrode 210 and cathode electrode 212. However, mirror 214, at the left end of tube 206, and mirror 216, at the right end of tube 206, have as yet not been attached. Therefore, originally tube 206 includes a first opening at the left end thereof (to which mirror 214 will be attached) and a second opening at the right end thereof (to which mirror 216 will be attached).

As further shown in FIG. 2, an exhaust port of tube 206 is connected to the exhaust tubulation of a vacuum system beneath the table by a quick connect port. Before tube 206 is placed in holder 202, it has been internally washed in triple distilled acetone and blown dry in order to remove all solid contaminants. Also, alignment laser 204 and holder 202 are oriented with respect to each other on table 200 so that alignment laser beam 218 is substantially coincident with the longitudinal axis of bore 210. In addition, pin-hole target card 220 is situated so that alignment laser beam 218 passes through the pinhole thereof and pinhole target card 220 is within a predetermined distance, such as 3 inches, from the right opening of laser tube 206. After initially setting up laser tube 206 as just discussed, the actual process of attaching and aligning the internal mirrors, with which the present invention is concerned, is commenced.

First as indicated in FIG. 1, mirror 214 and mirror 216 are placed, respectively, over the left and right end openings of tube 206. Specifically, mirror 214, which is a totally reflecting mirror, is first placed over the left end opening of tube 206 and is adjusted in position so that alignment laser beam 218 is reflected back through the bore and is centered through the pinhole of pinhole target card 220. Then, mirror 216, which is slightly transmissive and is used as the output mirror, is placed over the right end opening of tube 206 and is adjusted in position until it reflects alignment laser beam 218 back through the pinhole of pinhole target card 220.

As indicated in FIG. 1, the next step is evacuating tube 206. This is accomplished by opening main valve 222. The vacuum created in tube 206 will hold both mirrors 214 in their respective aligned positions as just set with alignment laser 204.

Then, as indicated in FIG. 1, the next step is to apply a mirror sealant which remains soft for at least a given time. The sealant may be an epoxy having a suitably low vapor pressure, such as "Torr Seal," a filled epoxy resin sold by Varian Associates of Palo Alto, California for the purpose of repairing small leaks in vacuum systems. This sealant is furnished with a hardening agent so that the seal will cure at room temperature after the elapse of a given time, or faster under moderate heat. In particular, at room temperature, the sealant will remain sufficiently soft to permit the manipulation and adjustment of the mirrors for about 20 minutes, although it may take as long as an hour for the sealant to completely harden.

While the sealant remains soft, as indicated in FIG. 1, an oxidizing discharge is produced in the tube to remove contaminants, followed by the backfilling of the tube with the laser gas, after which takes place the peaking of the lasing output during the existance of a lasing discharge in the tube. In the manner in which these steps are accomplished is shown in FIG. 2.

Referring again to FIG. 2, with main valve 222 remaining open, valve 224 is opened to permit oxygen from bottle 226 to leak at a set rate determined by leak rate valve 228 through the vacuum tubulation and the quick connect port into tube 206. At the same time oxidizing power supply 230 is connected between anode 210 and cathode 212 to establish an oxidizing glow discharge which extends from anode 210, down bore 208 and then back to cathode 212. By way of example, this glow discharge may be at 6 milliamperes with the oxygen pressure in the tube established at 0.3 Torr. As is known, its oxygen discharge heats and burns contaminants, the produced waste gases which are quickly sucked out of the tube by the vacuum system.

As soon as the contaminants have been removed from the tube, which occurs in a relatively short time long before the sealant has hardened, valve 224 is closed and tube 206 is pumped out to approximately $10^{-4}$ Torr. Then, main valve 222 is closed.

The next step is the introduction of the lasing gas, which, by way of example is He-Ne mixed at a 4:1 ratio. This gas is stored in bottle 232. Valve 234 is now open to permit lasing gas from bottle 232 to leak into tube 206 at a rate determined by the setting of leak rate valve 236. If the proper amount of lasing gas, such as 2 – 3 Torr for example, has leaked into tube 206, valve 234 is closed.

At this time operating power supply 238 is connected between anode 210 and cathode 212 to produce a lasing discharge of the laser gas in bore 208. Thus, tube 206 will produce a laser output beam to a partially transmissive mirror 216. After a short time of operation, the temperature and pressure conditions of tube 206 will stabilize and the tube will achieve mechanical equilibrium. At this time, when the mirror sealant is still soft, the output power of the laser beam is measured by means of sensor 240 and power meter 242. In particular, at least a portion of the output laser beam is directed to and is incident on sensor 240, resulting in power meter 242 registering a reading which is proportional to the output power of the laser beam then existing. Under mechanical equilibrium conditions, with the lasing gas discharge present, the relative positions of mirror 214 and mirror 216 are adjusted within the still soft sealant until power meter 242 indicates that peak output is being obtained. Then, operating power supply 238 is disconnected.

The total elapsed time from the application of the soft sealant until the mirrors have been aligned to provide peak power is well within the given time interval required for the sealant to harden. For instance, the total adjustment period may be in the order of 12 – 15 minutes, while, as discussed above, it takes about 20 minutes for the sealant to become relatively hardened and, perhaps, an hour until it becomes completely hardened.

Referring back to FIG. 1, the next step is to return the tube to atmospheric pressure. In the manner in which this is accomplished at the remote station shown in FIG. 2 is to wait until the mirror sealant has become quite hard (between 20 minutes and 1 hour after the application of the soft sealant, with a period of about one-half hour normally being sufficient). At this time, valve 244 is opened to permit an auxiliary gas, which may be filtered air or an inert gas such as argon, to fill tube 206 to atmospheric pressure. After this, the quick connect port is opened and tube 206 is removed from support fixture 202 and is thereafter put into storage for as long as desired. The storage of tube 206 is indicated by the "hold" step in FIG. 1.

It will be noted that the remote station, as just described, it is necessary to wait for a considerable period after the mirrors have been adjusted to provide peak output until the sealant is sufficiently hardened to permit tube 206 to be returned to atmospheric pressure without the danger of the now correctly adjusted relative positions of the mirror being altered. This, of course, reduces the rate of production capability of such a remote station. One way of reducing or eliminating this undesired waiting period is to provide means for heating the sealant to cause it to harden faster. Another way is to employ some sort of valve coupling between the exhaust tubulation of tube 206 and the quick connect port. In this latter case, this valve coupling could be kept open until the step of peaking the laser output during the laser discharge had been completed. After this, such a valve coupling could be closed so that tube 206 could be disconnected from the vacuum system and removed from support fixture 202 without altering the internal pressure then existing in tube 206. The remote station can be used to process the next tube, while the sealant on the previous tube is still hardening. After the mirror sealant on a tube has hardened, the step of returning it to atmospheric pressure could be accomplished and the coupling valve removed therefrom.

In any case, once the sealant has hardened and the tube has been returned to atmospheric pressure, it can be processed like any other type of gas discharge device, without any need to consider the fact that it includes as part of its envelope precisely aligned mirrors.

In particular, as indicated in FIG. 1, a conventional or automatic exhaust machine may now be used for gain evacuating the tube, followed by a second oxidizing discharge, then baking the tube out, and a second backfilling with laser gas. Finally, in the exhaust machine, the exhaust tubulation of the tube may be permanently sealed, as is well known in the art.

The baking out must be done at a relatively low temperature, such as 120° C for instance, due to the fact that an epoxy sealant is adversely affected by temperatures that are significantly higher than this relatively low bakeout temperature.

What is claimed is:

1. A method for fabricating a sealed gas laser discharge device from a predetermined gas, first and second mirror members and a tube assembly comprising an envelope having respective first and second openings at opposite ends thereof and an evacuation port, said envelope also having in cooperative relationship therewith suitable means required for establishing a discharge therein, said method comprising the steps of:
   1. attaching said first and second mirror members respectively to said first and second openings of said envelope with a soft sealant which becomes hardened only after the elapse of a given time interval,
   2. during said given time interval and without any baking out said device evacuating said device through said port and thereafter for the first time introducing the proper amount of said predetermined gas required for desired lasing operation,
   3. during said given time interval establishing a certain discharge through said first-introduced predetermined gas, maintaining said certain discharge until mechanical equilibrium is achieved, and then adjusting the relative positions of said first and second mirrors in said still soft sealant until the lasing output from said device is at least in the vicinity of peak output,
   4. terminating said discharge,
   5. after said given time interval when said sealant has hardened, removing said gas through said port while returning said discharge device to atmospheric pressure without disturbing the adjusted relative positions of said first and second mirrors, and
   6. thereafter, said sealant has hardened, again evacuating said discharge device through said port, baking out said discharge device at a given temperature for a required time, introducing said proper amount of said predetermined gas for a second time, and permanently sealing said port in that order.

2. The method defined in claim 1, wherein step is carried out by an exhaust machine.

3. The method defined in claim 1, wherein step (1) includes the steps of employing an alignment laser to adjust the initial position of said first mirror in contacting relationship with said first opening of said tube assembly and to adjust the initial position of said second mirror in contacting relationship with said said opening of said tube assembly, to form with said first and second mirrors in their respective initial positions an optical resonant cavity for said laser, evacuating said device to thereby hold said first and second mirrors in their respective initial position under the force of external air pressure, and thereafter applying said soft sealant to said first mirror and one end of said tube assembly and to said second mirror and the other end of said tube assembly without moving said first and second mirrors from their respective initial positions.

4. The method defined in claim 1, wherein step (2) further includes the step occurring prior to the first introduction of said predetermined gas of introducing a given amount of oxygen into said device and establishing an oxygen glow discharge in said device for a given time while said device is evacuated.

5. The method defined in claim 4, wherein step (6) further includes the step of introducing a given amount of oxygen into said device and establishing an oxygen glow discharge in said device for a given time said device is evacuated.

6. In the fabrication of a gas laser employing a predetermined gas, said laser having integral mirrors fixedly attached to opposite ends of the envelope thereof by a sealant which is initially soft but which hardens after a given time interval, a method for adjusting the relative positions of said mirrors to obtain peak output from said laser during operation thereof, said method comprising the steps of:
   1. during said given time interval when said sealant is still soft fill said laser with the proper amount of said predetermined gas,
   2. during said given time interval when said sealant is still soft establishing a certain discharge through said gas,
   3. during said given time interval when said sealant is still soft maintaining said certain discharge until mechanical equilibrium is achieved,
   4. then during said given time interval when said sealant is still soft adjusting said relative positions of said mirrors in the presence of said certain discharge until said laser operates at least in the vicinity of peak output, and
   5. thereafter permitting said sealant to harden without disturbing the adjusted positions of said mirrors.

* * * * *